United States Patent Office 3,736,165
Patented May 29, 1973

3,736,165
METHOD FOR PROCESSING KAOLIN CLAY
Edgar W. Sawyer, Jr., Edison, N.J., assignor to Engelhard Minerals & Chemicals Corporation, Woodbridge Township, N.J.
No Drawing. Filed July 21, 1971, Ser. No. 164,945
Int. Cl. C09c 3/02; B03d 3/00
U.S. Cl. 106—288 B           1 Claim

ABSTRACT OF THE DISCLOSURE

In the wet processing of kaolin clay, the clay crude is initially defluocculated (dispersed) with a salt of a polymeric carboxylic acid as the primary diepersant. The deflocculated clay then undergoes further processing, e.g., fractionation, floccing, bleaching, filtration, rinsing and re-deflocculation. The preferred floccing agent is aluminum sulfate.

BACKGROUND OF THE INVENTION

My invention is concerned with the wet processing of kaolin clay to provide clay products which form deflocculated slurried products with exceptionally good stabilities.

In the conventional wet processing of kaolin clay crudes to provide bleached fractions of clays suitable, for example, as paper coating pigments, the clay-water systems involved in the processing undergo conversion from deflocculated conditions to a flocculated condition. Eventually the clays are usually re-deflocculated.

Thus, in the initial stages of processing, the crude is deflocculated in water to permit desanding and particle size classification. The fractionated clay is obtained as a deflocculated suspension which must be flocculated before filtration and rinsing. When the clay is bleached, which is usually the case, the deflocculated suspension is generally acidified and flocculated before bleaching and after bleaching it is filtered and washed (rinsed). However, the clay product is frequently required to be in deflocculated condition during use. In such a case, the wet processed kaolin clay may be purchased in the form of a dried (usually spray dried) predispersed product or in the form of a deflocculated concentrate (e.g., 70 percent solids) aqueous slurry. Sometimes the clay is supplied in acid form and is deflocculated during use. The deflocculated kaolin clay-water suspensions or slurries must be sufficiently fluid for convenient mixing, pumping, unloading and other handling. Gelled or excessively viscous suspensions are invariably unacceptable.

The primary dispersant used commercially to place crude kaolin clays in the initially deflocculated condition is generally sodium silicate or a sodium condensed phosphate salt, e.g., sodium hexametaphosphate. Such dispersant is frequently supplemented with soda ash or caustic soda. The flocculant is generally sulfuric acid or alum. The secondary dispersant, i.e., the reagent used to re-deflocculate the clay, must be a powerful reagent. Usually a sodium condensed phosphate salt such as sodium tripolyphosphate or tetrasodium pyrophosphate (TSPP) is employed.

Aqueous dispersions of clay which are deflocculated with condensed phosphate salts are generally lacking in viscosity stability because of the tendency of the condensed phosphate salts to hydrolyze and form phosphate compounds which are ineffective deflocculants for fine clays. This tendency is especially pronounced in warm climates, particularly when the deflocculated system is mildly agitated. Reversion of the dispersant is evidenced by thickening or gelation of the system. Thus, defloccu-lated high solids suspensions of kaolin clay are especially prone to thicken or gel during shipment in tank cars when the weather is warm or hot. Under these conditions, commercial shipments of high solids polyphosphate deflocculated suspensions may form semisolid masses which cannot be unloaded from tank cars.

PRIOR ART

To increase the useful life of high solids phosphate deflocculated clay-water suspensions, the suggestions have been made to incorporate various anionic polymers, e.g., polyphosphonates, polycarboxylates or polysulfonates, into the slurries containing the condensed phosphate dispersants. The supplementary or auxiliary dispersant is incorporated with kaolin clay which has previously undergone wet processing.

When carrying out such procedures, the primary dispersant no longer functions to improve the properties of the end product. In fact, the primary dispersant may be converted during wet processing into a material which has a detrimental effect on the storage stability of high solids slurries of re-deflocculated clay. For example, when sodium silicate is used as the primary dispersant for the crude clay and sulfuric acid is used to flocculate the clay during processing, freshly precipitated hydrated silica coats the surfaces of the clay particles. Similarly, aluminum phosphate precipitates and coats the surface of the clay particles when sodium hexametaphosphate or other condensed phosphate salt is used as the primary dispersant and alum is employed as the flocculant. These surface coatings undesirably affect colloidal and other properties of the clay in subsequent use. Thus, when sodium silicate is employed as the primary dispersant and sulfuric acid is used to flocculate the suspension, the stability of a high solids slurry of kaolin deflocculated with tetrasodium pyrophosphate is poorer than it would be if alum were employed for floccing.

On the other hand, when a condensed phosphate salt such as Calgon® is used as the primary dispersant and mineral acid is employed for floccing, the condensed phosphate tends to revert to an orthophosphate, which is an ineffective clay dispersant. Any condensed phosphate salt in the redeflocculated clay and derived from the primary dispersant will be no more effective than a subsequently added condensed phosphate salt would be in providing viscosity stable suspensions. This is attributable to the inherent instability of phosphate-deflocculated clay-water systems.

The suggestion has also been made to dispense with the use of condensed phosphate salts to re-deflocculate wet processed kaolin and to utilize organic polymeric compounds such as sodium polyacrylates to redeflocculate acid-flocced kaolin clay. Generally the organic polymers are more expensive than the condensed phosphates and, even when they are employed in this manner, the primary dispersant used during processing serves no beneficial function in the end product.

An object of the invention is to provide a method for wet processing kaolin clay whereby the primary dispersant is retained on the clay through subsequent flocculation, bleaching, filtering and rinsing, with the result that the primary dispersant functions in conjunction with any dispersant subsequently added to provide predispersed spray-dried or slurried products with exceptionally good stabilities.

The essence of my invention resides in the use of certain synthetic organic polymeric polycarboxylates as primary dispersants during the conventional wet processing of kaolin clay. The carboxylic polymers I employ are monovalent cation salts of polymeric carboxylic acids, the polymeric salts having molecular weights in the range of 500 to 4000. Preferred are polyacrylate salts or polymethacrylate salts having molecular weights in the range of 1000 to 4000.

In an especially preferred embodiment of the invention, I employ aluminum sulfate to flocculate the clay suspensions obtained when using polycarboxylic polymers as primary dispersants.

Generally, the use of the polycarboxylic acid salts as primary dispersants results in finished re-deflocculated kaolin products having better viscosity stability than products obtained with the conventional primary dispersants. By selecting alum as the floccing agent for use with this novel class of primary dispersants, the re-deflocculated kaolin products show exceptionally good viscosity stability.

While not wishing to be bound to any theory, the marked superiority of alum over mineral acid as a flocculant for clay processed with a salt of a polymeric carboxylic acid may be explained as follows. I postulate that mineral acid insolubilizes only a portion of the polymer, leaving a remainder which is rinsed away from the clay during subsequent processing. Only this remaining portion is available in dispersant-effective salt form when the clay is subsequently redispersed and neutralized. On the other hand, alum not only temporarily insolubilizes most of the polymers but it links the polymer to the kaolin surface, assuring retention during further processing. When the aluminum-polymer coated clay is re-deflocculated at a pH of 7 or above with a condensed phosphate salt, the polymer is free to serve as a dispersant and also may serve as a protective colloid (steric stabilization) or as an anchor polymer.

In putting my invention into practice, crushed clay crude is blunged in water in conventional manner. Normally the clay is blunged at about 15 percent to 25 percent solids. The organic polycarboxylic deflocculant is then added with agitation to the clay-water system. Typically, the polycarboxylic dispersant is employed in amount within the range of 0.02 percent to 0.2 percent, based on the weight of the clay. The polymer may be added in acid form to the bluged clay which may be alkalized, if necessary, to a pH above 6, preferably 7 or above, before or after addition of the polycarboxylic acid. Alternatively the polycarboxylic acid may be added in salt form. In this case, pH of the system should be adjusted to a value above 6, preferably above 7, in order to permit the salt of the polycarboxylic acid to function as a deflocculant. For reasons of economy the use of the polymer in the form of a sodium salt (preformed or formed in situ) is preferred. Ammonium, lithium and potassium salts of polycarboxylic polymers may be employed.

After addition of the primary dispersant, the clay is wet processed in conventional manner. This normally includes the steps of degritting, particle size fractionation, flocculation, thickening by partial removal of water from the clay flocs, bleaching at a pH below 4 with sodium or zinc hydrosulfite, filtration and rinsing with water. Bleaching may be omitted with some clays.

A mineral acid, e.g., sulfuric, hydrochloric, phosphoric, may be used to floc the clay. Generally sufficient acid is incorporated to reduce the pH of the slurry to a value below 4, usually within the range of 2.5 to 3.5.

In carrying out the preferred embodiment of the invention wherein alum (or other aluminum salt of a strong mineral acid) is employed as the floccing agent, sufficient aluminum salt is added to floc the suspension, i.e., for alum, 8 to 20 lbs. per ton of clay. If desired for optimum bleaching, additional acid may be added to drop the pH to 2.5 to 3.5.

Mixtures of mineral acid and aluminum salt may be employed to flocculate the clay and to adjust pH simultaneously.

The filtered, washed clay may be supplied as an acid clay for subsequent deflocculation by the user. Alternatively, the washed cake may be deflocculated at about 50 percent to 60 percent solids by addition of a deflocculant, normally a condensed phosphate salt alone or together with soda ash or caustic soda to adjust pH to 6 to 8. The resulting fluidized filter cake is dried, usually by spray drying, to provide a dry predispersed clay product for shipment. Improved high solids slurries of the wet processed clay (e.g., slurries containing 65 percent to 75 percent clay solids) may be obtained by treating the acid-filter cake in known manner, described hereinafter in illustrative examples. Germicides and sequestrants may also be incorporated with the predespersed dry or slurry products.

Many users of refined clay prefer or require the condensed phosphate salt dispersants in their formulations. Furthermore, the beneficial results realized by the practice of the present invention are especially noteworthy when condensed phosphate salts are used to re-deflocculate the wet processed clay. However, it is within the scope of the invention to employ powerful clay deflocculants other than condensed phosphate salts to redeflocculate the clay. Examples are sodium citrate, sodium polyacrylate, sodium polymethacrylate and alkylenedisphosphonic acid salts such as sodium salts of hydroxy ethylidenedisphosphonic acid. Irrespective of the dispersant employed to re-deflocculate the wet processed clay, a smaller amount of secondary dispersant is generally required to re-deflocculate the clay to form a slurry of minimum viscosity, as compared to the amount which would be required when wet processing the same clay with conventional primary dispersants.

EXAMPLES

In these examples, the starting clay was a Georgia soft clay crude from a mine in Washington County, Ga. This crude contained about 20 percent by weight free moisture and is typical of clay ore used as the source of wet processed No. 1 grade kaolin coating clay meeting specifications for "regular" viscosity products.

The objective of the processing was to provide a bleached fine size fraction of clay meeting No. 1 specifications and having a stable apparent viscosity (Brookfield, 10 r.p.m. with No. 3 spindle) below 500 cp. for as long a time as possible and also having acceptable Brookfield 100 r.p.m. and Hercules (high shear) viscosities.

In accordance with the present invention, crude kaolin clay (22.10 lbs.) was blunged for 30 minutes in 33.15 lbs. deionized water in a Cowles agitator. The pH of the slurry was 5.6. To deflocculate the slurry, "D-Floc® 70" (33 percent sodium polyacrylate in water, molecular weight about 1000) was added in amount of 0.10 percent, based on the calculated moisture-free weight of the clay (17.68 lbs.). After addition of the primary dispersant, the mixer was operated for 30 minutes. The resulting slurry had a pH of 5.8 and was too viscous for degritting and fractionation. A 10 percent solution of NaOH was added with mixing to increase pH to 7.5, thereby thinning the slurry. The agitation was terminated and the slurry was allowed to settle for 10 minutes. The slurry was decanted from the settled matter (principally nondispersed lumps of clay) and the suspension was passed through a 325 mesh (Tyler) vibrating screen to eliminate grit (sand). The degritted slurry was then transferred to a Bird centrifuge which was operated to produce as an overflow a deflocculated suspension of a fine size fraction of the crude clay, the fine clay being at least 90 percent finer than 2 microns (equivalent spherical diameter).

The suspension of fine kaolin clay was split into two portions to provide samples which would be flocculated with two different kinds of flocculants. One of these portions was flocced by adding a 20 percent solution of sulfuric acid until pH was 2.5 and mixing for 30 minutes. The other portion was flocced by adding a 20 percent alum solution to a pH of 4.3. Both samples of flocced clay were split into two portions. The portions which had been flocced with sulfuric acid were bleached with either 15 lbs./ton sodium hydrosulfite or 15 lbs./ton zinc hydrosulfite at a pH adjusted to about 3 by addition of sulfuric acid. The portions of clay which had been flocced with alum were bleached with 15 lbs./ton sodium or zinc hydrosulfite at a pH adjusted to about 4.9 by further additions of alum.

The four bleached, flocculated clay slurries were filtered and washed with 2 parts deionized water to 1 part by volume clay. Cake resistivities (wet) were in the range of 12,000 to 14,000 ohm-cm.

Following the general procedure described in U.S. 3,594,203 to Sawyer, Jr. et al., issued July 20, 1971, the cakes were made down into 55.0 percent solids aqueous slurries containing tetrasodium pyrophosphate in amount of 0.30 percent based on the weight of the dried clay and sodium hydroxide to adjust pH to 7.0. The slurries were separately spray dried in a Niro spray dryer to form four batches of predispersed microspheres.

The spray dried microspheres were separately formed into 70.0 percent solids slurries. Viscosity stability of the four slurries was determined by measuring the Brookfield and Hercules viscosities of the slurries after they had aged overnight (initial viscosities) and after they had aged for various periods of time at 130° F. The makedown procedure, viscosity measurements and aging procedure that were used are described in detail in the aforementioned patent of Sawyer et al.

Still in accordance with the invention, the procedures above described were repeated substituting for the "D-Floc 70" either "Dispex® 40" (40 percent sodium polyacrylate in water-molecular weight 2000) or sodium polymethacrylate (molecular weight 4000). Identical proportions of polymeric dispersants were used in all tests (0.03 percent polymer based on the dry clay weight). After addition of each polymeric carboxylic acid salt, the pH of the slurry was adjusted to 7.5 before screening, fractionating, floccing, bleaching, etc.

For purposes of comparison, conventional wet processing was carried out using sodium silicate solution as the primary dispersant. The sodium silicate ("O"®) was added as a 5 percent solution in amount of 0.10 percent "O" based on the mosture-free weight of the clay. After addition of the sodium silicate solution, pH was 6.7. Desanding and fractionation of the deflocculated suspension of crude clay was carried out at this pH.

Salient results are summarized in table form, such results including Brrokfield viscosity values (10 r.p.m., No. 3 spindle) for the 70 percent slurries as initially produced and the periods (weeks) during which the slurries could be maintained at 130° F. before the Brookfield values increased to values of 1000 cp. or above. In the case of slurries which retained apparent viscosities below 1000 cp. during the test period indicated, the Brookfield viscosity values after the expiration of the test period are reported in the table.

Data in the table show that the various combinations of primary dispersants, flocculating agents and bleach reagents, including those of the prior art, resulted in wet processed kaolin clay products which could be prepared into 70 percent solids deflocculated (TSPP) slurries having the desired initial apparent viscosity below 500 cp. However, when sodium silicate was used as the primary dispersant and acid was employed for floccing, the slurries thickened to viscosities in excess of 1000 cp. after being stored for only one week. When sodium silicate was used with alum rather than sulfuric acid, the slurries were stable for an additional period. However, after aging for two weeks the slurries had thickened appreciably. Thus, the slurry of clay processed with sodium silicate as primary dispersant, alum as flocculant and zinc hydrosulfite as the bleach reagent had an apparent viscosity of 4000 cp. after aging at 130° F. for only two weeks.

EFFECT OF PRIMARY DISPERSANT AND FLOCCULANT ON VISCOSITY STABILITY OF 70 PERCENT SOLIDS DEFLOCCULATED (TSPP) SLURRIES OF WET-PROCESSED KAOLIN CLAY

| Wet processing variables | | | Viscosity stability | | |
|---|---|---|---|---|---|
| Primary dispersant | Flocculant | Hydrosulfite bleach | Initial viscosity, cp.[a] | Time for viscosity to exceed 1,000 cp., weeks [a] | Viscosity after weeks indicated, cp./weeks [a] |
| Na polyacrylate (M.W. 1,000). | $H_2SO_4$ | Na | 320 | 4 | 2,000/4 |
| | $H_2SO_4$ | Zn | 320 | 5 | 2,000/5 |
| | Alum | Na | 230 | | 240/6 |
| | do | Zn | 260 | | 250/6 |
| Na polyacrylate (M.W. 2,000). | $H_2SO_4$ | Na | 320 | 3 | 2,000/3 |
| | $H_2SO_4$ | Zn | 290 | 3 | 2,000/3 |
| | Alum | Na | 270 | | 290/6 |
| | do | Zn | 270 | | 300/6 |
| Na polymethacrylate (M.W. 4,000). | $H_2SO_4$ | Na | 350 | 5 | 1,500/5 |
| | $H_2SO_4$ | Zn | 350 | 5 | 1,500/5 |
| | Alum | Na | 375 | | 500/5 |
| | do | Zn | 350 | | 390/5 |
| Sodium silicate | $H_2SO_4$ | Na | 330 | 1 | 2,000/1 |
| | $H_2SO_4$ | Zn | 300 | 1 | 5,000/1 |
| | Alum | Na | 300 | 2 | 1,000/2 |
| | do | Zn | 300 | 2 | 4,000/2 |

[a] Brookfield viscosity=10 r.p.m., #3 spindle.

Data in the table for slurries obtained from clay processed with various polymeric carboxylates as the primary dispersants show that, irrespective of the flocculant and bleach reagent employed, the slurries were stable at elevated temperatures for longer periods of time than when sodium silicate had been used as the primary dispersant. The data for the polyacrylates and the polymethacrylate and alum flocculant show that after 5 or 6 weeks' aging at elevated temperature, the high solids slurries were essentially unchanged in viscosity. Thus, for example, when sodium polyacrylate (M.W. 2000) was used as the primary dispersant and alum was used for floccing with sodium hydrosulfite bleach, the initial viscosity was 270 cp. After aging for 6 weeks at 130° F., the viscosity of the slurry was only 290 cp. In contrast, when sodium silicate was used with alum (sodium hydrosulfite bleach), the viscosity of the slurry of clay had increased from an initial value of 300 cp. to 1000 cp. after only 2 weeks.

A comparison of the results for acid and alum floccing of various polymeric carboxylate dispersed slurries shows that results with alum were markedly superior since the viscosity of wet processed clay obtained with alum floccing was essentially constant after aging for periods of time which resulted in thickening when acid was employed. However, even when acid was used with the organic polymers, the resulting clay products formed 70 percent solids slurries which were significantly more stable than the most stable slurries obtained with sodium silicate as the primary dispersant. Thus, the viscosities of slurries obtained from clay processed with polycarboxylates as primary dispersants and acid as the flocculant did not exceed 1000 cp. until they had been aged 3 to 5 weeks at elevated temperature, whereas the slurries obtained from clay processed with sodium silicate and alum had viscosities of 1000 cp. or above after 2 weeks.

The data in the table therefore show that sodium polycarboxylates produced more stable re-deflocculated 70 percent slurries of wet processed kaolin clay than did sodium silicate, irrespective of the reagents used for flocculating and bleaching during the wet processing. Further, the data show that alum produced results superior to those realized with mineral acid as the flocculant with both sodium silicate and sodium polycarboxylates. However, the improvements in viscosity stability when alum was used with the sodium polycarboxylates were significantly greater than the improvement realized when this floccing agent was employed with sodium silicate.

I claim:
1. In the wet processing of kaolin clay by steps which comprise mixing crude kaolin clay in water in the presence of a primary clay dispersant to form a deflocculated clay slurry, removing coarse particles therefrom so as to obtain a fine size fraction of clay in the form of a deflocculated suspension, flocculating said deflocculated suspension by adding an acidic substance, filtering the flocced clay, washing the resulting filter cake and re-deflocculating the washed clay at a pH of 7 or above with a condensed phosphate salt to form a high solids fluid aqueous slurry of fine clay, the improvement which comprises utilizing an organic polymer selected from the group consisting of sodium polyacrylate having a molecular weight within the range of 1000 to 4000 and sodium polymethacrylate having a molecular weight within the range of 1000 to 4000 as the primary dispersant at an alkaline pH and employing aluminum sulfate as the acidic substance to flocculate the suspension which was deflocculated with said primary dispersant.

References Cited
UNITED STATES PATENTS

| | | | |
|---|---|---|---|
| 1,324,958 | 12/1919 | Feldenheimer | 209—5 |
| 3,130,063 | 4/1964 | Millman | 106—288 B |
| 3,346,488 | 10/1967 | Lyons | 106—72 X |
| 3,528,769 | 9/1970 | Lyons | 106—72 X |
| 3,594,203 | 7/1971 | Sawyer et al. | 106—288 B |
| 3,657,134 | 4/1972 | King | 106—72 |

FRANK W. LUTTER, Primary Examiner

R. HALPER, Assistant Examiner

U.S. Cl. X.R.

201—5